Oct. 21, 1941.   G. E. BARNHART   2,259,446
DIFFERENTIAL PRESSURE INDICATOR
Filed March 2, 1940   2 Sheets-Sheet 1
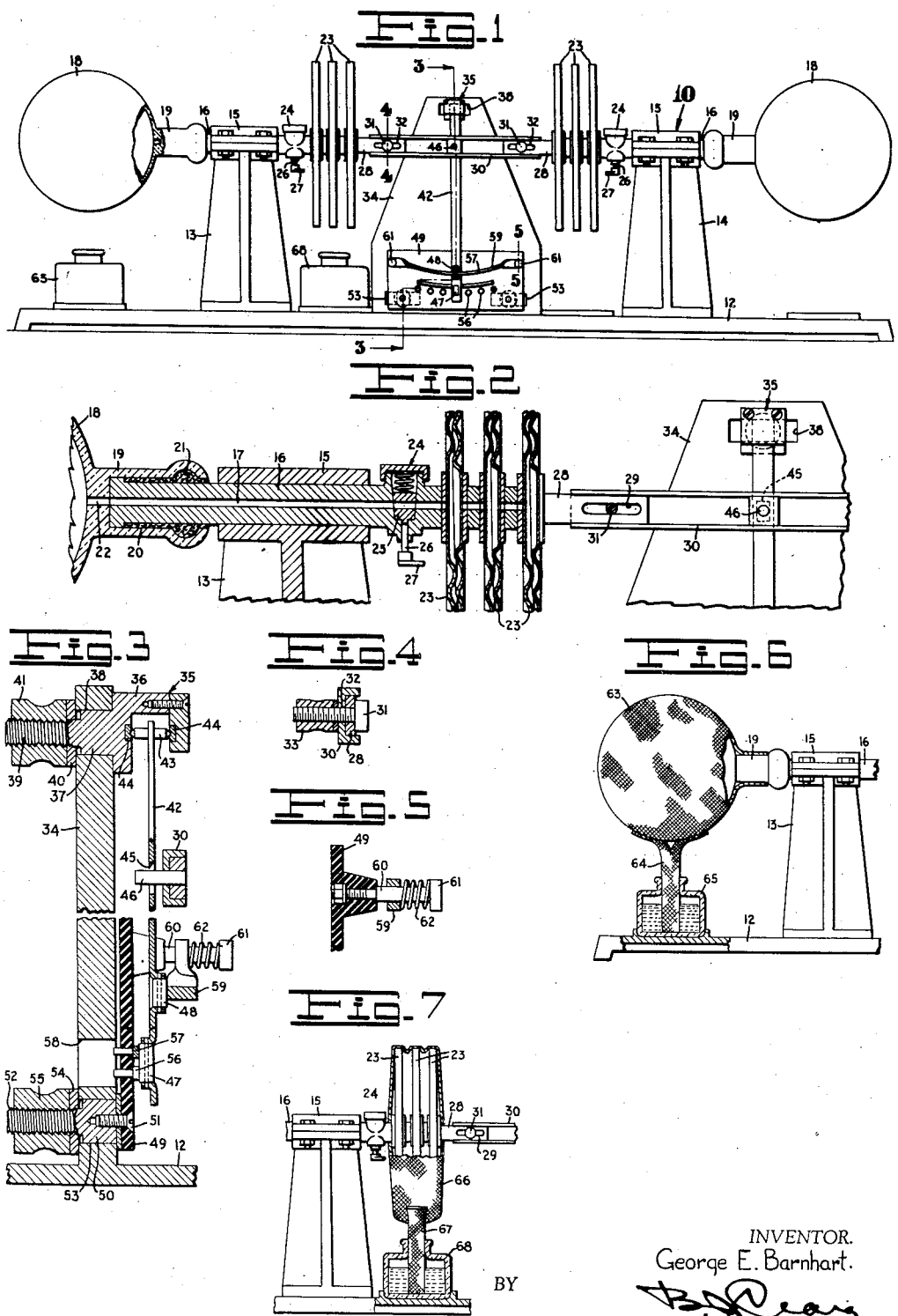
INVENTOR.
George E. Barnhart.
BY
ATTORNEY Oct. 21, 1941. G. E. BARNHART 2,259,446
DIFFERENTIAL PRESSURE INDICATOR
Filed March 2, 1940 2 Sheets-Sheet 2
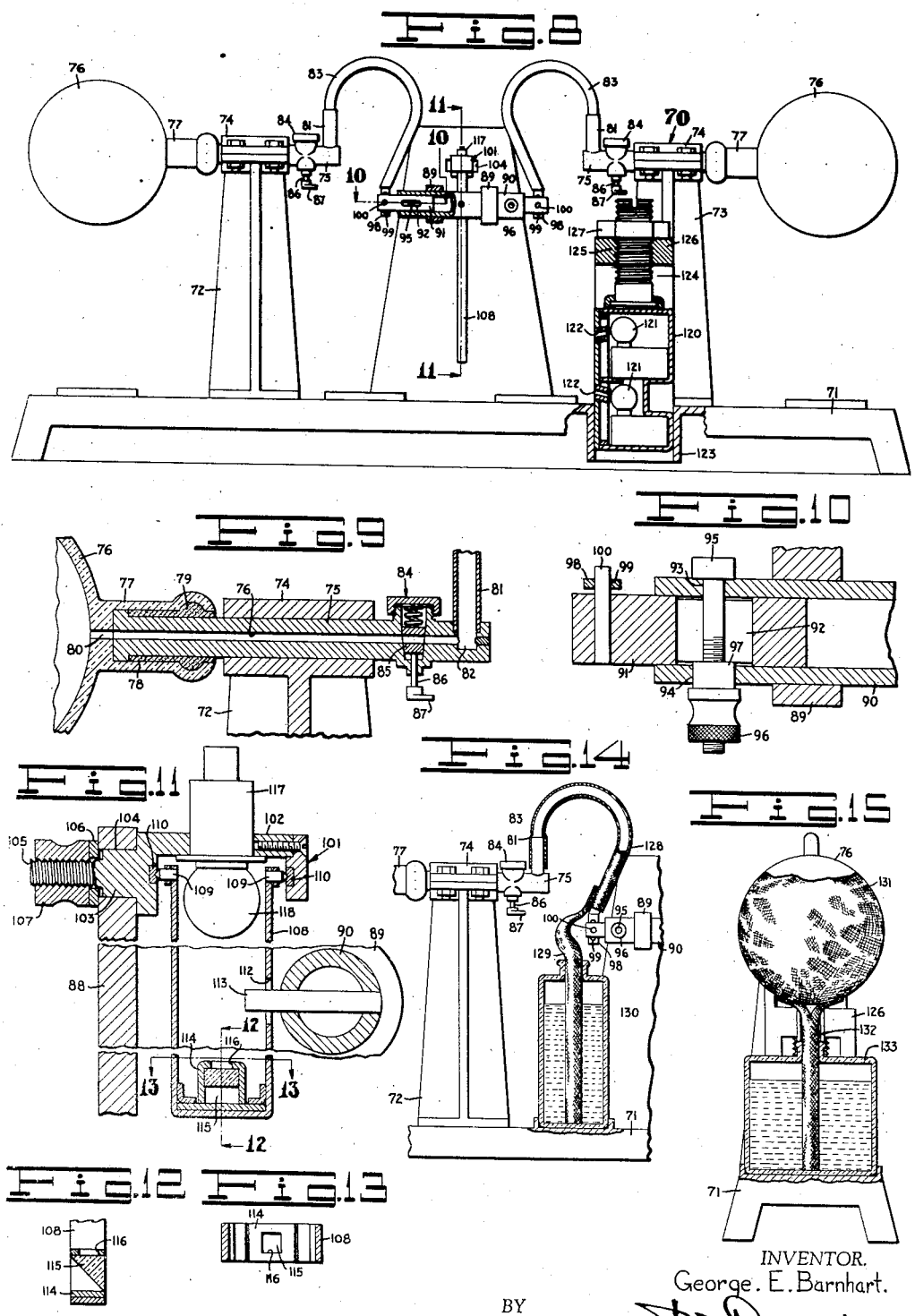
INVENTOR.
George. E. Barnhart.
BY
ATTORNEY Patented Oct. 21, 1941

2,259,446

UNITED STATES PATENT OFFICE 2,259,446

DIFFERENTIAL PRESSURE INDICATOR

George E. Barnhart, Pasadena, Calif.

Application March 2, 1940, Serial No. 321,955

7 Claims. (Cl. 200—83)

This invention relates to improvements in registering instruments.

The general object of the invention is to provide an improved instrument for registering atmospheric changes.

Another object of my invention is to provide a novel recording instrument including a plurality of hollow expansion members which may be of equal volume and which contain gas which may be under different pressures in the respective members and wherein the movement of an indicator is subject to the combined effect of the members.

A further object of the invention is to provide an instrument including expansible and contractable members whose movement is effected by forces supplied by members connected thereto.

Another object of the invention is to provide an instrument including expansion and contraction members which serve to control a circuit which circuit may include a light means.

A further object of the invention is to provide a balanced pair of expansible and contractable elements wherein the elements may be thrown out of balance by evaporative means applied to one of them and wherein, if desired, the elements may serve to control an electric circuit.

An additional object of the invention is to provide a pair of expansible and contractable elements which mutually cooperate to control movement of an indicator when one of the elements is subjected to evaporative effects and wherein the indicator will not move when the instrument is subjected to barometric and temperature changes.

An additional object of the invention is to provide an instrument including a pair of opposed expansible and contractable members whose movement is effected by forces supplied by other members connected thereto and wherein one of the other members responds to atmospheric changes and the other to humidity changes.

Other objects and the advantages of this invention will be apparent from the following description taken in connection with the accompanying drawings, wherein:

Fig. 1 is a side elevation, partly in section, showing my improved registering instrument;

Fig. 2 is an enlarged fragmentary view similar to Fig. 1 with portions thereof in section;

Fig. 3 is an enlarged fragmentary section taken on line 3—3, Fig. 1 with parts broken away;

Fig. 4 is an enlarged section taken on line 4—4, Fig. 1;

Fig. 5 is an enlarged section taken on line 5—5, Fig. 1;

Fig. 6 is a fragmentary view similar to Fig. 1 with parts thereof in section and showing an evaporative member on one of the bulbs;

Fig. 7 is a fragmentary view similar to Fig. 1 with parts thereof in section and showing an evaporative member on one of the expansible and contractable members;

Fig. 8 is a side elevation partly in section of a modified form of my invention;

Fig. 9 is an enlarged fragmentary sectional detail of a portion of the device shown in Fig. 8;

Fig. 10 is an enlarged section taken on line 10—10, Fig. 8;

Fig. 11 is an enlarged fragmentary section taken on line 11—11, Fig. 8;

Fig. 12 is a section taken on line 12—12 Fig. 11;

Fig. 13 is a section taken on line 13—13, Fig. 11;

Fig. 14 is a fragmentary view similar to Fig. 8 showing an evaporative member on one of the expansible and contractable members; and Fig. 15 is an end view of the device shown in Fig. 8 showing an evaporative member on one of the bulbs.

Referring to the drawings by reference characters I have indicated my improved instrument generally at 10. As shown the device 10 includes a base 12 having spaced brackets 13 and 14 thereon which include bearing portions 15.

Supported in each of the bearings 15 I provide a rod 16 having a small axial bore 17 therethrough (see Fig. 2). On the outer portions of each of the rods 16 I provide a glass bulb member 18 which includes a neck portion 19.

Each of the neck portions 19 has a recess 20 therein to receive the rod 16 which is hermetically sealed thereto by a suitable cement 21. Each of the necks 19 further includes a small aperture 22 opening into the interior of the bulb and into the recess 20 which when the bulb and tube are connected communicates with the tube aperture 17.

Inwardly from the brackets 13 and 14 each of the tubes is connected to a plurality of interconnected expansible and contractable members such as bellows 23.

Intermediate the bulb and the bellows each of the rods 16 includes a valve member 24 which is shown as of the plug valve type for controlling the passageway through the bore 17. The plugs 25 of each of the valves 24 include a stem portion 26 having an operating handle 27 thereon.

Each of the innermost bellows elements 23 includes an extended arm 28 having an elongated slot 29 therein. The two arms 28 are positioned within the flanges of a connecting channel member 30 (see Fig. 4) and each of the arms is releasably connected to its associated channel by a bolt 31 positioned in the arm slot 29 and in an aperture 32 in the channel. Each of the arms 28 is adapted to be clamped to the channel 30 by a thumb nut 33 positioned on the bolt 31. Although both the bulbs 18 and the bellows 23 are shown as of equal volume this is by way of illustration only as each may be of a suitable volume while the bulbs and/or bellows may have gases of different pressures therein, and this is preferably the case when the device is set up as shown in Fig. 1. Thus as atmospheric conditions change one set of bellows will expand thereby contracting the other set, thus moving the channel 30.

Intermediate the brackets 13 and 14 the base includes an upwardly extending support 34 on which a pivot member 35 is mounted. As clearly shown in Fig. 3 the pivot member 35 includes an inverted U-shaped portion 36 and a polygonal shank portion 37 which is positioned in an elongated aperture 38 in the support 34. The pivot member 35 further includes a reduced threaded stem 39 extending from the shank 37 and has a washer 40 and a thumb nut 41 thereon by which the pivot member 35 is clamped to the support 34.

The pivot member 35 supports a depending indicating arm 42 which adjacent the upper end includes a trunnion member 43 which is pivotally supported in bearing members 44 in the pivot member 35.

A predetermined distance below the trunnion 43 the arm 42 has a vertically elongated aperture 45 therein in which a pin 46 secured to the channel 30 is positioned. Thus when the channel 30 is moved as previously described the arm 42 will be swung about the axis of the trunnion 43.

Adjacent the lower end the arm 42 supports a roller member 47 having a vertical axis and a predetermined distance thereabove a similar roller member 48 also having a vertical axis.

Mounted on the support 34 adjacent the base 12 I provide a contact plate 49 which is made of an electrical insulating material. Adjacent each end the plate 49 has a polygonal shank 50 secured thereto as by a screw 51 and each of the shanks 50 includes a reduced threaded stem 52. The shanks 50 are each positioned in a horizontally elongated slot 53 in the support 34 and each of the threaded stems 52 has a washer 54 and a thumb nut 55 thereon by means of which the shanks 50 are clamped to the support 34.

Adjacent the roller 47 the plate 49 has a plurality of arcuately arranged spaced electrical contacts 56 thereon and thereabove an arcuately shaped electrical contact bar 57.

The contacts 56 and the contact bar 57 may be connected to any suitable electrically operated device desired by suitable wires (not shown) which would extend through an aperture 58 (Fig. 3) in the support 34.

The roller 47 on the arm 42 bridges between the contact bar 57 and the contacts 56 and to retain the roller in engagement with the contact bar and the contacts I provide an arcuately shaped bar 59 the ends of which are slidably supported on studs 60 mounted on the plate 49 (see Fig. 5).

The studs 60 include enlarged heads 61 spaced outwardly from the bar 59 and surrounding each of the studs 60 between the heads 61 and the bar 59 I provide a coiled spring 62 which resiliently urges the bar 59 towards the roller 48 which it contacts thereby urging the roller 47 into engagement with the contacts and contact bar.

At times it may be desired to use only one set of bellows 23 and its associated bulb 18 and this may be done by loosening one of the thumb nuts 33 thereby allowing the bar 30 to move without moving the other bellows 23.

At other times it may be desired to eliminate the effect of the gases within one or both of the bulbs 18 and this may be done by closing one or both of the valves 24.

To cause the device 10 to react to humidity changes a cloth or other evaporative member 63 is positioned over one of the bulbs 18 as shown in Fig. 6. The member 63 has a wick 64 connected thereto which extends into a container 65 having water therein.

The device 10 will also react to humidity changes by placing an evaporative member 66 over one set of the bellows members 23 as shown in Fig. 7. The member 66 has a wick member 67 connected thereto which extends into a container 68 having water therein.

In this form the device may be used to indicate changes in the humidity of the air. A reduction in humidity of the air will cause increased evaporative cooling of the bulb covered by the evaporative member 63 thereby reducing the gas pressure within this bulb and causing the bellows connected thereto to contract, thus shifting the arm 42.

The evaporative members may be placed on either the bulb 18 or on the bellows members 23 as just described or such members may be placed on both the bulb and bellows members on one side of the device.

In Fig. 8 I have indicated a modified form of my invention generally at 70. As shown the device 70 includes a base 71 having spaced brackets 72 and 73 thereon which include bearing portions 74.

Supported in each of the bearings 74 I provide a rod 75 having a small axial bore 76 therethrough (see Fig. 4). On the outer portions of each of the rods 75 I provide a glass or other transparent bulb member 76 which includes a neck portion 77.

Each of the neck portions 77 has a recess 78 therein to receive the rod 75 which is hermetically sealed thereto by a suitable cement 79. Each of the necks 77 further includes a small aperture 80 opening into the interior of the bulb and into the recess 78 which when the bulb and tube are connected communicates with the tube aperture 76.

Inwardly from the brackets each of the rods 75 has a vertical tube 81 secured thereto, the interior of which communicates with the bore 80 through an aperture 82 in the rod 75. The open end of a Bourdon tube 83 is secured to the tube 81 and communicates with the interior thereof.

Intermediate the bulbs 76 and the tubes 81 each of the rods 75 includes a valve member 84 which is shown as of the plug valve type for controlling the passageway through the bore 76. The plugs 85 of each of the valve members 84 includes a stem portion 86 having an operating handle 87 thereon.

Intermediate the brackets 72 and 73 the base 71 has an upwardly extending support member 88 thereon which includes two spaced apertured brackets 89 extending therefrom.

Positioned in the brackets 89 I provide tube 90 which is slidable therein. Positioned in the tube 90 adjacent each end I provide a rod 91 having an elongated aperture 92 therethrough. Adjacent the aperture 92 the tube 90 has an aperture 93 therein and opposite which the tube 90 has an enlarged aperture 94 therein.

The shank of a bolt 95 is positioned in the aperture 93 and extends through the aperture 92 in the rod 91 and through the enlarged tube aperture 94.

A thumb nut 96 which includes a reduced extended portion 97 is positioned on the bolt 95 with the portion 97 positioned in the tube aperture 94. When the nut 96 is tightened on the bolt the nut portion 97 engages the rod 91 thereby clamping the rod 91 to the tube 90.

The closed ends of each of the Bourdon tubes 83 has a finger portion 98 extending therefrom each of which have an elongated aperture 99 therethrough to receive a pin 100 in the rods 91.

With the device 70, as with the device 10, each set of bulb and expansible and contractable members may have gases of different pressures therein, thus as atmospheric conditions change, one Bourdon tube 83 will expand thereby contracting the other and thus moving the tube 90.

Intermediate the brackets 89 and thereabove a pivot member 101 is mounted on the support 88. As clearly shown in Fig. 11 the pivot member 101 includes an inverted U-shaped portion 102 and a polygonal shank portion 103 which is positioned in an elongated aperture 104 in the support 101. The pivot member 101 further includes a reduced threaded stem 105 extending from the shank 103 and has a washer 106 and a thumb nut 107 thereon by means of which the pivot member 101 is clamped to the support 88.

The pivot member 101 supports a depending U-shaped stirrup 108 each leg of which adjacent the upper end includes a trunnion member 109 which is pivotally supported in a bearing member 110 in the pivot member 101. The outer leg of the stirrup 108 has a vertically elongated aperture 112 therein in which a pin 113 in the tube 90 is positioned. Thus when the tube 90 is moved as previously described the stirrup 108 will be swung about the axis of the trunnions 109.

Mounted in an inverted U-shaped bracket 114 on the bottom of the stirrup 108 I provide a reflecting prism 115 above which the bracket has an aperture 116.

Supported by the pivot member 101 I provide an electric light socket 117 to receive an electric light bulb 118 the light rays from which pass through the aperture 116 in the bracket 114 and through the prism 115 whereby they are directed to one side, thereby multiplying the indicator movement without adding an inertia effect.

At the side of the device 10 to which the light rays are directed I provide a closed container 120 in which I show two light sensitive elements such as photo-electric cells 121. One face of the container 120 has ports 122 therein which direct light rays onto the photo-electric cells.

The container 120 is shown as positioned in a well 123 in the base 71 and suspended from a threaded shank 124 which is positioned in a threaded aperture 125 in a bracket portion 126. A nut 127 is provided on the shank 124 to lock the shank in an adjusted position.

To cause the device 70 to react to humidity changes a cloth evaporation member 128 is positioned over one of the Bourdon tubes 83 as shown in Fig. 14. The member 128 has wick member 129 connected thereto which extends into a container 130 having water therein.

The device will also react to humidity changes by placing an evaporation member 131 over one of the bulbs 76 as shown in Fig. 15. The member 131 has a wick member 132 connected thereto which extends into a container 133 having water therein.

The evaporation members may be placed on either one of the bulbs or on one of the Bourdon tubes as just described or the members may be placed on both the bulb and Bourdon tube on one side of the device.

Having thus described my invention, I claim:

1. In a device of the class described, a base having a pair of axially aligned hollow rods supported thereon, a bulb member connected to each of said rods and communicating therewith, means for controlling passage of fluid through each rod, a hollow expansion and contraction member mounted on each rod and communicating with the interior of the rod, means connecting the expansion and contraction members, a support on the base, an indicating arm movably mounted on said support, means operable by said connecting means for shifting said indicating arm, a plurality of spaced contact members on the support and a circuit closer on said indicating arm and movable to engage the spaced contact members.

2. In a device of the class described, a base having a pair of axially aligned hollow rods supported thereon, a bulb member connected to each of said rods and communicating therewith, means for controlling passage of fluid through each rod, a hollow expansion and contraction member mounted on each rod and communicating with the interior of the rod, a connecting member, means securing the connecting member to each expansion and contraction member, a support on the base, an indicating arm pivotally mounted on said support, means whereby when said connecting member is shifted said indicating arm is moved, a plurality of spaced contact members on the support, a circuit closer on said indicating arm and movable to engage the spaced contact members, and means to urge the circuit closer towards the contact members.

3. In a device of the class described, a base having a pair of axially aligned hollow rods supported thereon, a bulb member connected to each of said rods and communicating therewith, means for controlling passage of fluid through each rod, an expansion and contraction member mounted on each rod and communicating with the interior of the rod, a connecting member, means securing the connecting member to each expansion and contraction member, a support on the base, an indicating arm pivotally mounted on said support, means whereby when said connecting member is shifted said indicating arm is moved, a plurality of spaced contact members on the support, a circuit closer on said indicating arm and movable to engage the spaced contact members, and means to urge the circuit closer towards the contact members.

4. In a device of the class described, a base having a pair of axially aligned hollow rods supported thereon, a bulb member connected to each of said rods and communicating therewith, means for controlling passage of fluid through each rod, an expansion and contraction member mounted on each rod and communicating with the interior of the rod, a connecting member, means securing the connecting member to each expansion and contraction member, a support on the base, an indicating arm pivotally mounted on said support, means whereby when said connecting member is shifted said indicating arm is moved, an insulated contact plate on the support, an elongated contact member on the plate, spaced contact members on the plate, a circuit closer on said indicating arm and movable with the arm in engagement with the elongated contact member and adapted to engage the spaced contact members in order, and means to urge the circuit closer towards the contact members.

5. In a device of the class described, a base having spaced brackets thereon, a hollow rod supported on each bracket, said rod being axially aligned, a bulb member connected to each of said rods and communicating therewith, valve means for controlling passage of fluid through each rod, an expansion and contraction member mounted on each rod and communicating with the interior of the rod, an arm connected to each expansion and contraction member, a connecting member, adjustable means securing the connecting member to each arm, a support on the base, an indicating arm pivotally mounted on said support, means whereby when said connecting member is shifted said indicating arm is moved, an insulated contact plate on the support, an elongated contact member on the plate, spaced contact members on the plate, a roller mounted on said indicating arm and movable with the arm in engagement with the elongated contact member and adapted to engage the spaced contact members, and means to urge the roller towards the contact members.

6. In a device of the class described, a base having spaced brackets thereon, a hollow rod supported on each bracket, said rod being axially aligned, a bulb member having a neck hermetically connected to each of said rods and communicating therewith, a valve on each hollow rod remote from the bulb and controlling passage of fluid through the associated rod, an expansion and contraction member mounted on each rod and comprising a plurality of elements communicating with the interior of the rod, an arm connected to each expansion and contraction member, a connecting member, slotted means for releasably and adjustably securing the connecting member to each of said arms, a support on the base, a shiftable pivot on said support, an indicating arm on the pivot, means whereby when said connecting member is shifted said indicating arm is moved, an insulated contact plate shiftably mounted on the support, an elongated contact member on the plate, spaced contact members on the plate, a roller mounted on said indicating arm and movable with the arm in engagement with the elongated contact member and adapted to engage the spaced contact members, and resilient means urging the roller towards the contact members.

7. In a device of the class described, a base having spaced brackets thereon, a hollow rod supported on each bracket, said rods being axially aligned, a bulb member having a neck hermetically connected to each of said rods and communicating therewith, a valve on each hollow rod remote from the bulb and controlling passage of fluid through the associated rod, an expansion and contraction member mounted on each rod and comprising a plurality of elements communicating with the interior of the rod, an arm connected to each expansion and contraction member, a connecting member, slotted means for releasably and adjustably securing the connecting member to each of said arms, a support on said base, an indicating arm, a pivotal mounting for said arm, means to shiftably support the pivotal mounting on the support, means whereby when said connecting member is shifted said indicating arm is moved, an insulated contact plate, means to shiftably mount the plate on the support, an elongated contact member on the plate, spaced contact members on the plate, a roller mounted on said indicating arm and movable with the arm in engagement with the elongated contact member and adapted to engage the spaced contact members in order, a second roller on said indicating arm and resilient shiftable means engaging said second roller to urge the indicating arm so that the first roller thereon engages the contact members, each bulb and each expansion and contraction member communicating with the receptacles and being adapted to be engaged by an evaporative member.

GEORGE E. BARNHART.